US009945341B2

(12) United States Patent
Kato

(10) Patent No.: US 9,945,341 B2
(45) Date of Patent: Apr. 17, 2018

(54) NEGATIVE PRESSURE ABNORMALITY DETECTION APPARATUS, AND CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Hirokazu Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 14/946,149

(22) Filed: Nov. 19, 2015

(65) Prior Publication Data

US 2016/0169139 A1    Jun. 16, 2016

(30) Foreign Application Priority Data

Dec. 15, 2014    (JP) ................................. 2014-253410

(51) Int. Cl.
*F02N 11/08*    (2006.01)
*B60T 17/22*    (2006.01)
*B60T 8/88*    (2006.01)

(52) U.S. Cl.
CPC ............ *F02N 11/084* (2013.01); *B60T 8/885* (2013.01); *B60T 17/221* (2013.01);
(Continued)

(58) Field of Classification Search
CPC ...... F02N 11/084; B60T 8/885; B60T 17/221; B60T 2270/413; Y02T 10/48; F02D 2250/41
See application file for complete search history.

(56) References Cited

U.S. PATENT DOCUMENTS 6,322,164 B1 *  11/2001  Sakamoto ............. B60T 8/3275
                                                                303/114.3
6,398,316 B1 *   6/2002  Mizutani ............... B60T 8/4809
                                                                123/295
(Continued)

FOREIGN PATENT DOCUMENTS

JP    2011-122519 A    6/2011
JP    2014-070531 A    4/2014
(Continued)

*Primary Examiner* — Hung Q Nguyen
*Assistant Examiner* — Brian P Monahon
(74) *Attorney, Agent, or Firm* — Oliff PLC

(57) ABSTRACT

A negative pressure abnormality detection apparatus includes a negative pressure sensor to output a signal representing negative pressure in a negative pressure chamber of a brake booster into which intake negative pressure of an intake manifold generated by rotation of an engine is introduced; a negative pressure detection unit to detect the negative pressure based on the signal; an abnormality determination unit to determine whether an abnormality occurs with the negative pressure sensor, based on whether the negative pressure is shifted toward atmospheric or vacuum pressure relative to a threshold, when a state continues for a predetermined time or longer during which the engine rotates and a negative-pressure-expending braking operation is not performed; and a threshold change unit to change the threshold depending on opening of a throttle valve in an intake pipe connected with the intake manifold, while the state continues.

7 Claims, 4 Drawing Sheets

(52) U.S. Cl.
CPC ..... *B60T 2270/413* (2013.01); *F02D 2250/41* (2013.01); *Y02T 10/48* (2013.01)

(56) References Cited

U.S. PATENT DOCUMENTS

| | | | |
|---|---|---|---|
| 2003/0038539 A1* | 2/2003 | Wild | B60T 17/18 303/122.09 |
| 2007/0234716 A1* | 10/2007 | Hirooka | B60T 17/02 60/397 |
| 2010/0168978 A1* | 7/2010 | Schubert | B60T 13/72 701/76 |
| 2010/0211282 A1* | 8/2010 | Nakata | B60T 8/4081 701/70 |
| 2010/0222991 A1* | 9/2010 | Berr | B60T 7/18 701/112 |
| 2011/0313615 A1* | 12/2011 | Bligard | F02D 9/06 701/30.8 |
| 2012/0138006 A1* | 6/2012 | Gwon | F02N 11/0818 123/179.4 |
| 2012/0150406 A1* | 6/2012 | Tomura | B60W 10/06 701/70 |
| 2013/0204512 A1* | 8/2013 | Mizuno | F02D 45/00 701/112 |
| 2014/0032071 A1* | 1/2014 | Strengert | B60L 3/0023 701/70 |

FOREIGN PATENT DOCUMENTS

| | | |
|---|---|---|
| JP | 2014-120865 A | 6/2014 |
| JP | 2016-000972 A | 1/2016 |
| WO | 2015/189673 A1 | 12/2015 |

\* cited by examiner

NEGATIVE PRESSURE ABNORMALITY DETECTION APPARATUS, AND CONTROL APPARATUS FOR INTERNAL COMBUSTION ENGINE

FIELD

The disclosures herein generally relate to a negative pressure abnormality detection apparatus, and a control apparatus for an internal combustion engine.

BACKGROUND

Conventionally, a negative pressure abnormality detection apparatus has been known that determines whether a negative pressure sensor is abnormal (see, for example, Patent Document 1). Such an abnormality detection apparatus includes a negative pressure sensor that outputs a signal depending on negative pressure, and detects the negative pressure based on the signal from the negative pressure sensor. Then, based on a result of the negative pressure detection, the apparatus determines whether the negative pressure sensor is abnormal. Specifically, the apparatus determines that the negative pressure sensor is in an abnormal state if a state continues for a predetermined time or longer during which the signal from the negative pressure sensor deviates out of a desired normal range due to a disconnection, a power short, a ground short, etc.

Also, a vehicle having the negative pressure abnormality detection apparatus installed, which is described in Patent Document 1, includes a brake booster that assists a braking operation by the driver, by using intake negative pressure of an intake manifold that is generated by rotation of an internal combustion engine (referred to as "inmani negative pressure" below). Also, this vehicle is a stop-and-start control vehicle that has the internal combustion engine stop automatically if a predetermined stopping condition is satisfied, and after the automatic stopping, has the internal combustion engine restart automatically if a predetermined restarting condition is satisfied. Then, if the negative pressure sensor is determined to be in an abnormal state as described above, automatic stopping of the internal combustion engine is inhibited.

Incidentally, while the negative pressure sensor still outputs the signal that changes depending on the negative pressure, an abnormality may occur with the negative pressure sensor that includes, in addition to a disconnection, a power short, or a ground short described above, an abnormality due to deviation in which a gain shift or an offset shift is generated that may be caused by the temperature characteristic or change over the years. However, the control apparatus described in Patent Document 1 cannot determine that an abnormality occurs until reaching a state where the output signal of the negative pressure sensor deviates out of the desired normal range. Therefore, if the output signal of the negative pressure sensor has a gain shift or an offset shift, but the shift is comparatively small such that it is contained within the desired normal range, the control apparatus cannot detect the abnormality due to deviation of the negative pressure sensor. Therefore, even if an abnormality due to deviation occurs with the negative pressure sensor, the abnormality due to deviation may not be detected as an abnormality of the negative pressure sensor.

Thereupon, to determine whether an abnormality due to deviation occurs with the negative pressure sensor, one may consider a method that has the internal combustion engine rotate for generating an inmani negative pressure; determines whether the detected negative pressure value based on a signal from the negative pressure sensor is shifted toward the positive pressure side or the vacuum pressure side with respect to a threshold; and based on the shift, determines whether an abnormality due to deviation occurs with the negative pressure sensor.

RELATED-ART DOCUMENTS

Patent Documents

[Patent Document 1] Japanese Laid-open Patent Publication No. 2011-122519

However, the inmani negative pressure described above fluctuates depending on the opening of a throttle valve (referred to as the "throttle opening" below) disposed in an intake pipe on the upstream side of the intake manifold. The throttle opening changes considerably depending on a driving situation of the vehicle (specifically, an acceleration operation, an air conditioner operation, etc.). Therefore, the inmani negative pressure fluctuates considerably depending on such a driving situation of the vehicle. For example, when the fuel is cut, the throttle opening is less, and the inmani negative pressure is greater. Also, when the air conditioner operates in the height of summer, the throttle valve opens moderately, and the inmani negative pressure is not so great.

Therefore, if the threshold of the negative pressure to determine whether an abnormality due to deviation occurs with the negative pressure sensor, is fixed to a constant value regardless of the throttle opening, the negative pressure sensor may be erroneously determined to be in an abnormal state. For example, if the throttle opening is comparatively greater, even though no abnormality due to deviation toward the atmospheric pressure side actually occurs with the negative pressure sensor, the detected negative pressure may be less than the fixed threshold, and erroneously determined as an abnormal state. Also, conversely, if the throttle opening is comparatively less, even though an abnormality due to deviation toward the atmospheric pressure side actually occurs with the negative pressure sensor, the detected negative pressure may be greater than the fixed threshold, and the abnormality cannot be determined. Furthermore, if the throttle opening is comparatively greater, even though an abnormality due to deviation toward the vacuum pressure side actually occurs with the negative pressure sensor, the detected negative pressure may be less than the fixed threshold, and the abnormality cannot be determined. Also, conversely, if the throttle opening is comparatively less, even though no abnormality due to deviation toward the vacuum pressure side actually occurs with the negative pressure sensor, the detected negative pressure may be greater than the fixed threshold, and erroneously determined as abnormal.

In view of the above, at least one embodiment of the present invention has an object to provide a negative pressure abnormality detection apparatus that can correctly determine whether an abnormality occurs with the negative pressure sensor, and a control apparatus for an internal combustion engine that can precisely inhibit the internal combustion engine from stopping automatically when an abnormality occurs with the negative pressure sensor.

SUMMARY

According to at least one embodiment of the present invention, a negative pressure abnormality detection apparatus includes a negative pressure sensor configured to output a signal depending on a negative pressure in a negative pressure chamber of a brake booster into which an intake negative pressure of an intake manifold generated by rotation of an internal combustion engine is introduced; a negative pressure detection unit configured to detect the negative pressure based on the signal from the negative pressure sensor; an abnormality determination unit configured to determine whether an abnormality occurs with the negative pressure sensor, based on whether the negative pressure detected by the negative pressure detection unit is shifted toward an atmospheric pressure side or a vacuum pressure side with respect to a threshold, when a state continues for a predetermined time or longer during which the internal combustion engine rotates and a negative pressure expending operation expending the negative pressure is not performed on a brake pedal by a driver; and a threshold change unit configured to change the threshold depending on an opening of a throttle valve disposed in an intake pipe on an upstream side of the intake manifold, while the state continues.

According to at least one embodiment of the present invention, it is possible to correctly determine whether an abnormality occurs with the negative pressure sensor. Also, it is possible to precisely inhibit the internal combustion engine from stopping automatically when an abnormality occurs with the negative pressure sensor.

DESCRIPTION OF EMBODIMENTS

In the following, specific embodiments of a negative pressure abnormality detection apparatus and a control apparatus for an internal combustion engine will be described according to the present invention with reference to the drawings.

Figure 1:
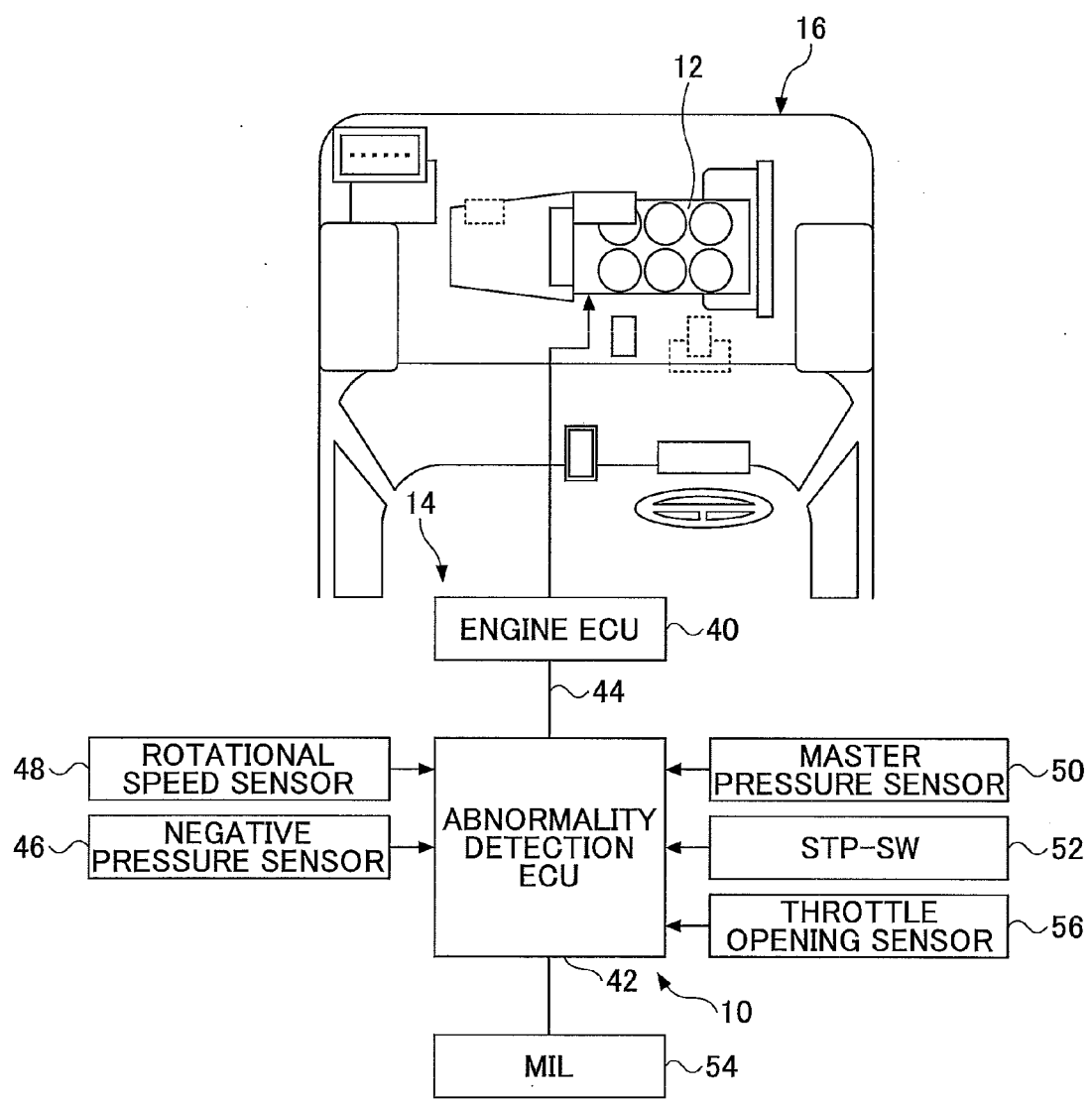
FIG. 1 is a system configuration diagram of a vehicle that has a negative pressure abnormality detection apparatus and a control apparatus for an internal combustion engine installed according to an embodiment of the present invention.
Figure 2:
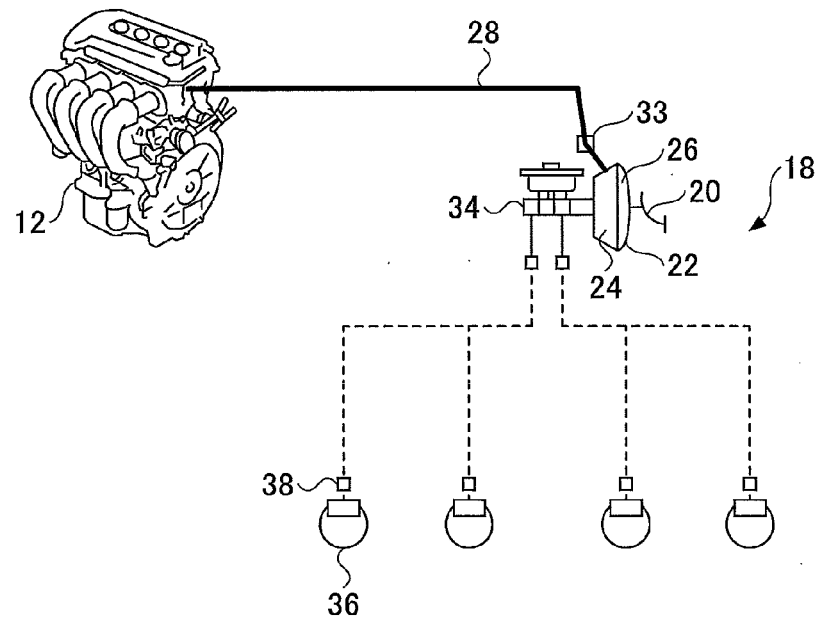
FIG. 2 is a configuration diagram of a brake system that is installed in the vehicle according to the present embodiment.

FIG. 1 illustrates a system configuration diagram of a vehicle 16 that has a negative pressure abnormality detection apparatus 10 and a control apparatus 14 for an internal combustion engine 12 installed according to an embodiment of the present invention. FIG. 2 illustrates a configuration diagram of a brake system 18 that is installed in the vehicle 16 according to the present embodiment. Also, FIG. 3 illustrates a configuration diagram that illustrates a relationship between the internal combustion engine 12 and a brake booster 22 that are installed in the vehicle 16 according to the present embodiment.

Figure 3:
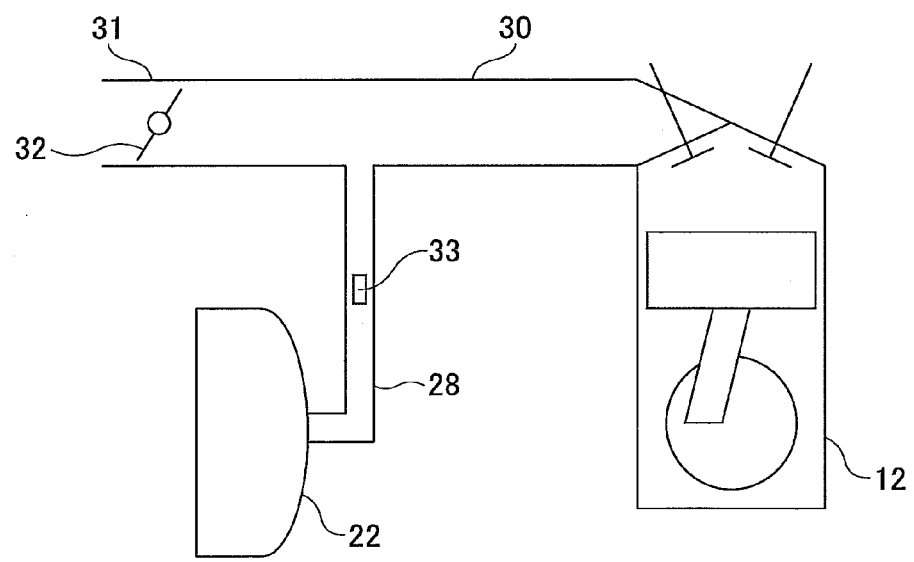
FIG. 3 is a configuration diagram that illustrates a relationship between an internal combustion engine and a brake booster that are installed in the vehicle according to the present embodiment.

As illustrated in FIG. 1 to FIG. 3, the vehicle 16 in the present embodiment includes the internal combustion engine 12 and the brake system 18. The internal combustion engine 12 is a heat engine that obtains power to move a vehicle by explosive combustion of fuel. The internal combustion engine 12 may be a gasoline engine, or may be a diesel engine. The internal combustion engine 12 can be started by an engine starter that is driven by electric power supplied from an in-vehicle battery.

The brake system 18 includes a brake pedal 20 and a brake booster 22. The brake pedal 20 is operated by a driver (specifically, by the foot) for braking the vehicle 16. To increase the brake force for the vehicle 16, the driver increases a pedaling operation force or an amount of stepping on the brake pedal 20. Also, in such a stepped-on state, to decrease the brake force of the vehicle 16, the driver decreases the pedaling operation force or the amount of stepping on the brake pedal 20. The brake pedal 20 is coupled with the brake booster 22.

The brake booster 22 is a booster that assists a pedaling operation on the brake pedal 20 by the driver. The brake booster 22 includes in its inside a negative pressure chamber 24 and a pressure change chamber 26 that are separated by a diaphragm. The negative pressure chamber 24 is connected with an intake manifold (referred to as an "inmani" below) 30 via a negative pressure pipe 28. The inmani 30 is a pipe to introduce air from an intake pipe 31 having an intake port, to the combustion chamber of the internal combustion engine 12. By rotation of the internal combustion engine 12, intake negative pressure is generated in the inmani (referred to as the "inmani negative pressure" below), whose pressure is lower than the atmospheric pressure.

The intake pipe 31 has a throttle valve 32 disposed. The throttle valve 32 is disposed on the upstream side of the inmani 30. The throttle valve 32 is a throttle valve whose opening is adjusted to change the cross-sectional area of the passage of the intake pipe 31. The opening of the throttle valve 32 is adjusted depending on an accelerator pedal operation by the driver of the vehicle and/or a driving situation of the vehicle. The inmani negative pressure fluctuates depending on the opening of the throttle valve 32 (referred to as the "throttle opening" below). Specifically, the inmani negative pressure takes a value on the atmospheric pressure side if the throttle opening is greater, or takes a value on the vacuum pressure side if the throttle opening is less.

Halfway through the negative pressure pipe 28, a check valve 33 is provided, which is a one-way valve, and allows airflow to go through only from the negative pressure chamber 24 side to the inmani 30 side. The check valve 33 opens when pressure on the negative pressure chamber 24 side of the negative pressure pipe 28 is higher than pressure on the inmani 30 side. The inmani negative pressure of the inmani 30 is introduced in the negative pressure pipe 28 and the negative pressure chamber 24 (namely, the brake booster 22). Negative pressure is generated in the negative pressure chamber 24 in accordance with the inmani negative pressure.

Note that, in the following, stating that "the negative pressure is great" means that the pressure is on the side close to 0 kPa (vacuum pressure), and stating that "the negative pressure is small" means that the pressure is on the side close to the atmospheric pressure. Stating that "the negative pressure rises" means that the pressure changes closer to the zero side, and stating that "the negative pressure reduces" means that the pressure changes closer to the atmospheric pressure side.

If the brake pedal 20 is not stepped on, namely, a pedaling operation on the brake pedal 20 is released, the negative pressure in the negative pressure chamber 24 is introduced into the pressure change chamber 26 of the brake booster 22. In this case, not much differential pressure is generated between the pressure change chamber 26 and the negative pressure chamber 24. On the other hand, if the brake pedal 20 is stepped on, the atmosphere is introduced into the pressure change chamber 26 depending on a brake pedaling force applied to the brake pedal 20. In this case, differential pressure is generated between the pressure change chamber 26 and the negative pressure chamber 24, depending on the brake pedaling force. This differential pressure operates as an assist force that has a predetermined boost ratio with respect to the brake pedaling force applied to the brake pedal 20.

Therefore, if a pedaling operation is performed on the brake pedal 20 while the internal combustion engine 12 rotates, the brake booster 22 generates an assist force that assists the brake pedaling force of the driver transferred to the brake booster 22, by using the negative pressure in the negative pressure chamber 24. Note that the negative pressure in the negative pressure chamber 24 of the brake booster 22 changes depending on a drive time and a stop time of the internal combustion engine 12, and an operation on the brake pedal 20.

The brake booster 22 is coupled with a master cylinder 34 that includes a hydraulic pressure chamber to be filled with a brake oil. In the hydraulic pressure chamber of the master cylinder 34, master cylinder pressure is generated depending on a resultant force of the brake pedaling force and the assist force of the brake booster 22. The master cylinder 34 is connected with wheel cylinders 38 that are provided for respective wheels 36. The wheel cylinders 38 provide brake forces to the respective wheels 36 depending on the master cylinder pressure in the master cylinder 34.

The control apparatus 14 installed in the vehicle 16 includes an electronic control unit for controlling an engine (referred to as the "engine ECU" below) 40 that is configured mainly with a microcomputer. The engine ECU 40 is electrically connected with units built in the internal combustion engine 12, including actuators such as an injector for fuel injection, a fuel pump, and an engine starter. The engine ECU 40 controls driving or stopping the actuators of the internal combustion engine 12, and starting or stopping the engine starter.

Also, if a predetermined stopping condition is satisfied, the engine ECU 40 can have the internal combustion engine 12 stop automatically, and after the automatic stop of the internal combustion engine 12, if a predetermined restarting condition is satisfied, can have the internal combustion engine 12 start (restart) automatically. In the following, the control is referred to as the stop-and-start (S&S) control. Namely, the vehicle is a so-called "idling stop" vehicle that executes the S&S control. The S&S control can improve the fuel efficiency of the vehicle 16 because the internal combustion engine 12 can be stopped automatically if the predetermined stopping condition is satisfied.

The predetermined stopping condition in the S&S control is that the vehicle decelerates (for example, the vehicle speed reduces to a predetermined vehicle speed or lower; or the deceleration of the vehicle is greater than or equal to a predetermined deceleration), which may take place when the driver performs a pedaling operation on the brake pedal 20 for braking, after the internal combustion engine 12 has been started to make the vehicle 16 start traveling. Also, the predetermined restarting condition includes that, after the S&S control has started, a relaxing operation is performed on the brake pedal; an acceleration operation is performed; the electric load in the vehicle 16 becomes greater than or equal to a predetermined value; and the like.

Also, the negative pressure abnormality detection apparatus 10 installed in the vehicle 16 includes an electronic control unit for detecting a negative pressure abnormality (referred to as the "abnormality detection ECU 42" below) that is mainly configured with a microcomputer. The abnormality detection ECU 42 and the engine ECU 40 are connected with each other via an in-vehicle LAN (Local Area Network) 44. The in-vehicle LAN 44 is a communication bus, for example, a CAN (Controller Area Network). The abnormality detection ECU 42 and the engine ECU 40 can transmit and receive data with each other via the in-vehicle LAN.

The abnormality detection ECU 42 is connected with a negative pressure sensor 46. The negative pressure sensor 46 is disposed in the negative pressure chamber 24 of the brake booster 22, or in the negative pressure pipe 28 (referred to as a "negative pressure generation location" below). The negative pressure sensor 46 outputs a signal depending on the negative pressure being generated in the negative pressure generation location. The negative pressure sensor 46 is a sensor to monitor the negative pressure in the negative pressure generation location. The output signal from the negative pressure sensor 46 is supplied to the abnormality detection ECU 42. Based on the output signal from the negative pressure sensor 46, the abnormality detection ECU 42 detects the negative pressure Pvac in the negative pressure generation location with respect to the atmospheric pressure as a reference.

While the internal combustion engine 12 is being automatically stopped by the S&S control, if the negative pressure Pvac detected as above is not secured to be greater than or equal to a predetermined value (namely, taking a value on the atmospheric pressure side with respect to the predetermined negative pressure), the abnormality detection ECU 42 executes a process to release the automatic stopping to have the internal combustion engine 12 start automatically, and to secure the negative pressure in the negative pressure chamber 24. Specifically, the abnormality detection ECU 42 issues a command to the engine ECU 40 via the in-vehicle LAN 44, to have the internal combustion engine 12 start automatically. Note that the predetermined negative pressure is a minimum negative pressure that needs to be generated in the negative pressure generation location, to have the brake booster 22 generate an assist force that is necessary to keep the vehicle stopped, without requiring the driver to step on the brake pedal 20 with a great pedaling force.

Having received the above command for automatic starting, the engine ECU 40 has the internal combustion engine 12 start automatically, which has been stopped automatically by the S&S control. Therefore, if the negative pressure in the negative pressure chamber 24 is reduced while having the internal combustion engine 12 stop automatically by the S&S control, the internal combustion engine 12 is started automatically, and hence, the negative pressure in the negative pressure chamber 24 can be recovered.

Also, the abnormality detection ECU 42 may transmit data representing the negative pressure Pvac detected as described above, to the engine ECU via the in-vehicle LAN 44. In this case, the engine ECU 40 may use the negative pressure Pvac to control driving the actuators in the internal combustion engine 12. Note that, instead of this, the data representing the negative pressure Pvac may be directly supplied from the negative pressure sensor 46 to the engine ECU 40, to be used for controlling driving the actuators of the internal combustion engine 12.

The abnormality detection ECU 42 is connected with a rotational speed sensor 48. The rotational speed sensor 48 is disposed at a crankshaft or a cam of the internal combustion engine 12. The rotational speed sensor 48 outputs a signal that depends on a crank angle or a cam angle of the internal combustion engine 12. The output signal from the rotational speed sensor 48 is supplied to the abnormality detection ECU 42. Based on the signal supplied from the rotational speed sensor 48, the abnormality detection ECU 42 detects the crank angle or the cam angle of the internal combustion engine 12, and detects the rotational speed NE of the internal combustion engine 12.

The abnormality detection ECU 42 is connected with a master pressure sensor 50. The master pressure sensor 50 is disposed in a hydraulic pressure chamber of the master cylinder 34. The master pressure sensor 50 outputs a signal that depends on pressure generated in the hydraulic pressure chamber of the master cylinder 34. The output signal from the master pressure sensor 50 is supplied to the abnormality detection ECU 42. Based on the output signal from the master pressure sensor 50, the abnormality detection ECU 42 detects the pressure Pm in the hydraulic pressure chamber of the master cylinder 34 (referred to as the "master pressure" below). Also, based on the detected master pressure Pm, the abnormlity detection ECU 42 can detect the pedaling force of a braking operation by the driver, which takes zero as a reference when the brake pedal 20 is not stepped on at all.

The abnormality detection ECU 42 is connected with a stop lamp switch 52. The stop lamp switch 52 is a switch that is turned on and off depending on a brake operation on the brake pedal 20 by the driver. The stop lamp switch 52 is turned on when a pedaling operation is performed on the brake pedal 20 in a release state, and turned off when a pedaling operation is not performed on the brake pedal 20 in a release state. The abnormality detection ECU 42 detects the state of the stop lamp switch 52.

The abnormality detection ECU 42 is connected with a meter indicator lamp (MIL) 54 that is disposed in a meter visible to the driver. Based on the negative pressure Pvac in the negative pressure chamber 24 detected as described above, the abnormality detection ECU 42 determines whether the negative pressure sensor 46 is in an abnormal state (including an abnormal state due to deviation such as a gain shift or an offset shift), as will be described in detail later. If determining that the negative pressure sensor 46 is in an abnormal state, the abnormality detection ECU 42 issues a command to the engine ECU 40 via the in-vehicle LAN 44, to inhibit the internal combustion engine 12 from stopping automatically by the S&S control; stores the abnormal state of the negative pressure sensor 46 in a diagnostic memory; and has the MIL 54 lit to display an indication of the abnormality of the negative pressure sensor 46, or the inhibition of having the internal combustion engine 12 stop automatically.

Also, the abnormality detection ECU 42 is connected with a throttle opening sensor 56. The throttle opening sensor 56 outputs a signal that depends on the throttle opening of the throttle valve 32. The output signal from the throttle opening sensor 56 is supplied to the abnormality detection ECU 42. Based on the signal supplied from the throttle opening sensor 56, the abnormality detection ECU 42 detects the throttle opening C of the throttle valve 32 (for example, between 0% and 100%).

Figure 5:
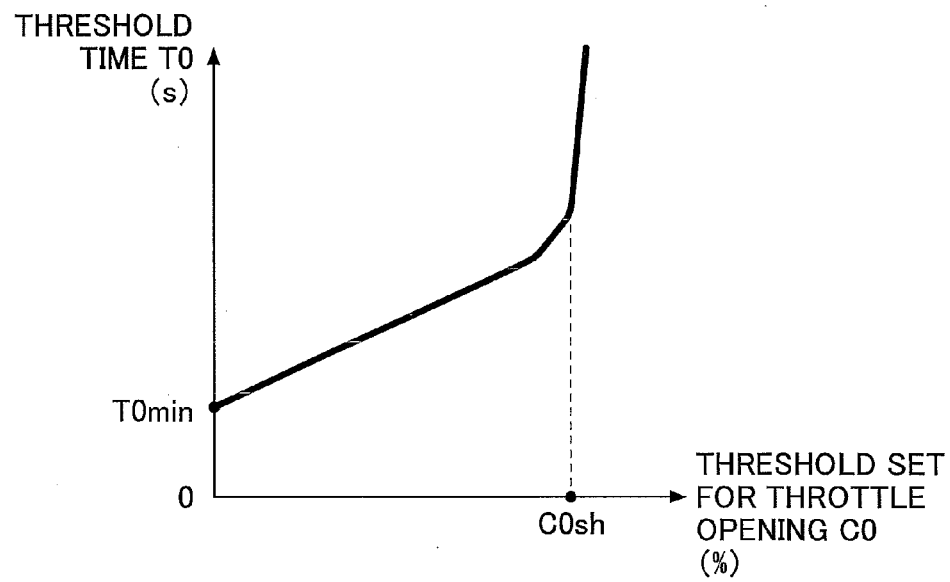
FIG. 5 is an example of a graph that illustrates a relationship between the threshold set for the throttle opening C0 and the threshold time T0 used in the present embodiment.
Figure 6:
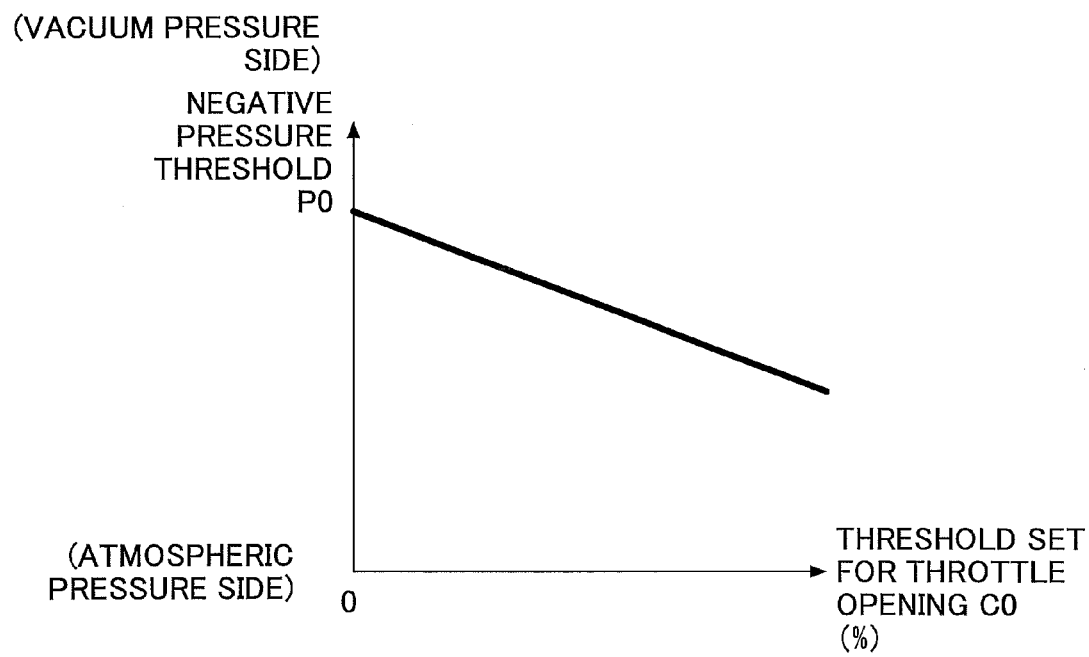
FIG. 6 is an example of a graph that illustrates a relationship between the threshold set for the throttle opening C0 and the negative pressure threshold P0 used in the present embodiment.

Next, with reference to FIG. 4 to FIG. 6, operations of the negative pressure abnormality detection apparatus 10 and the control apparatus 14 for the internal combustion engine 12 will be described according to the present embodiment.

Figure 4:
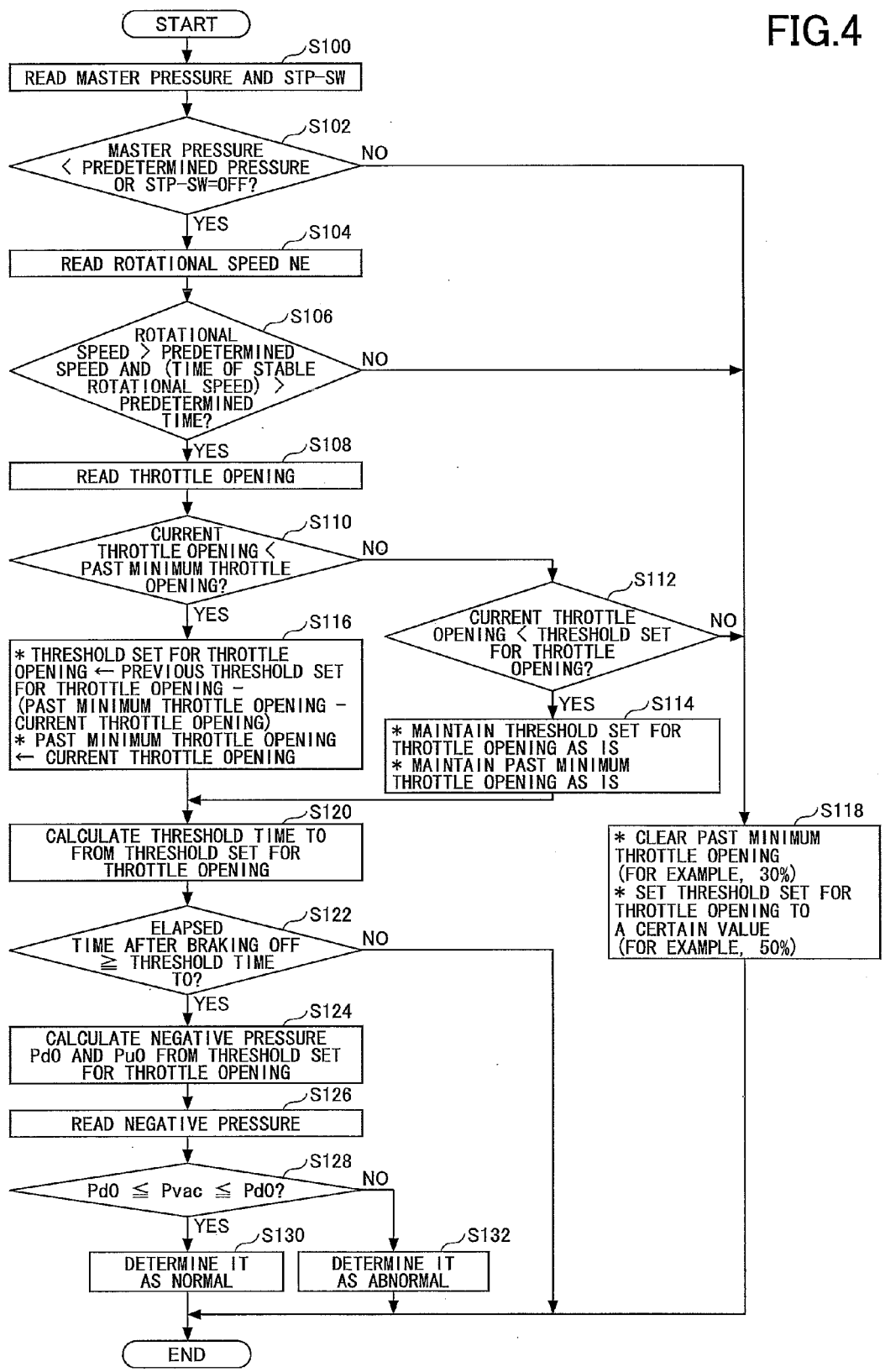
FIG. 4 is a flowchart of an example of a control routine executed in a negative pressure abnormality detection apparatus and a control apparatus for an internal combustion engine according to the present embodiment.

FIG. 4 is a flowchart of an example of a control routine executed in the negative pressure abnormality detection apparatus 10 and the control apparatus 14 for the internal combustion engine 12 according to the present embodiment. FIG. 5 is an example of a graph that illustrates a relationship between the threshold set for the throttle opening C0 and the threshold time T0 used in the present embodiment. FIG. 6 is an example of a graph that illustrates a relationship between the threshold set for the throttle opening C0 and the negative pressure threshold P0 used in the present embodiment.

In the brake system 18 in the present embodiment, the negative pressure in the negative pressure chamber 24 is expended while the braking operation position (namely, the amount of the stroke of a braking operation or the pedaling force of a braking operation) of the brake pedal 20 changes. Specifically, if a brake pedaling operation is performed that is to step on the brake pedal 20, the capacity of the negative pressure chamber 24 of the brake booster 22 is reduced, and consequently, the negative pressure in the negative pressure chamber 24 is reduced toward the atmospheric pressure side. Also, if a pedaling operation is released in a state where the brake pedal 20 has been under the pedaling operation, the brake pedaling force is reduced to introduce the negative pressure in the negative pressure chamber 24 into the pressure change chamber of the brake booster 22, and consequently, the negative pressure in the negative pressure chamber is steeply reduced toward the atmospheric pressure side.

Also, if a brake relaxing operation is performed on the brake pedal 20 while having the internal combustion engine 12 stop automatically by the S&S control, then, the predetermined restarting condition described above is satisfied to have the internal combustion engine 12 start automatically, and consequently, the rotational speed of the internal combustion engine 12 rises, following behind the reduction of the negative pressure in the negative pressure chamber 24. Having the internal combustion engine 12 start rotating, the inmani negative pressure is generated in the inmani 30, which makes the negative pressure in the negative pressure chamber 24 gradually rise from the atmospheric pressure side toward 0 kPa on the vacuum pressure side. Note that if a braking operation on the brake pedal 20 hardly changes, namely, neither a brake pedaling operation nor a brake relaxing operation are performed, this rise of the negative pressure in the negative pressure chamber 24 takes place in a state that depends on the inmani negative pressure (specifically, the rotational speed and/or the throttle opening of the internal combustion engine 12).

In the negative pressure abnormality detection apparatus 10 in the present embodiment, the abnormality detection ECU 42 reads the output signals of the master pressure sensor 50 and the stop lamp switch 52 every predetermined time (Step S100). Then, the abnormality detection ECU 42 determines whether the master pressure Pm based on a sensor value from the master pressure sensor 50 is less than predetermined pressure, or the stop lamp switch 52 is in an off state (Step S102). Note that this predetermined pressure is a minimum value of the master pressure Pm determined in advance, with which it can be determined that a pedaling operation is performed in a release state of the brake pedal 20.

If determining at Step S102 that the master pressure Pm is less than the predetermined pressure, or the stop lamp switch 52 is in an off state, the abnormality detection ECU 42 determines that it is in a state where the brake pedal 20 is in a release state and not stepped on (the braking operation is off), and next, reads the output signal of the rotational speed sensor 48 (Step S104). Then, the abnormality detection ECU 42 determines whether the rotational speed NE of the internal combustion engine 12 based on a sensor value from the rotational speed sensor 48 exceeds a predetermined constant, and time during which the rotational speed NE is maintained to be stable (within a predetermined range) exceeds a predetermined time (Step S106).

Note that the above predetermined constant is a maximum rotational speed to represent that the internal combustion engine 12 does not rotate to an extent where the inmani negative pressure is generated, and may be set to, for example, 0 rpm that represents rotational stoppage. Also, the above predetermined time is a longest time determined in advance, with which the internal combustion engine 12 cannot be determined to rotate stably. Also, both the predetermined constant and the predetermined time may be set depending on the performance of the internal combustion engine 12 and/or the performance of the brake booster 22.

If determining at Step S106 that the rotational speed NE of the internal combustion engine 12 exceeds the predetermined constant, and time during which the rotational speed NE is maintained to be stable exceeds the predetermined time, the abnormality detection ECU 42 determines that the internal combustion engine 12 stably rotates to an extent where the inmani negative pressure is generated, and next, reads the output signal of the throttle opening sensor 56 (Step S108). Then, the abnormality detection ECU 42 determines whether the throttle opening C based on a sensor value from the throttle opening sensor 56 (referred to as the "current throttle opening" below) is less than a minimum value Cmin of the throttle opening C detected in the past by using the throttle opening sensor 56 (referred to as the "past minimum throttle opening" below) (Step S110). Note that an initial value and a clear value of the past minimum throttle opening Cmin correspond to a throttle opening with which the negative pressure can be securely introduced into the inmani 30 when the internal combustion engine 12 rotates, and may be set in advance to, for example, 30%.

If determining at Step S110 that C<Cmin is not satisfied, the abnormality detection ECU 42 determines that the throttle valve 32 is not open up to the past minimum throttle opening Cmin at a current timing, and the inmani negative pressure is on the atmospheric pressure side, and next, determines whether the current throttle opening C is less than a threshold set for the throttle opening C0 (Step S112).

Note that this threshold set for the throttle opening C0 is a threshold of the throttle opening to change a parameter used for determining whether the negative pressure sensor 46 is abnormal, as will be described in detail later, and is dynamically fluctuated depending on a state of opening of the throttle valve 32. Also, an initial value and a clear value of this threshold set for the throttle opening C0 correspond to a maximum throttle opening with which the negative pressure can be introduced into the inmani 30 when the internal combustion engine 12 rotates, and may be set in advance to a value greater than the initial value and the clear value of the past minimum throttle opening Cmin described above, for example, to 50%.

If determining at Step S112 that C<C0 is satisfied, the abnormality detection ECU 42 determines that the throttle valve 32 is closed to be less than the threshold set for the throttle opening C0 at the current timing, and next, executes a process to maintain the past minimum throttle opening Cmin and the threshold set for the throttle opening C0 at the respective values at the timing (Step S114).

On the other hand, if determining at Step S110 that C<Cmin is satisfied, the abnormality detection ECU 42 determines that the throttle valve 32 is closed to be less than the past minimum throttle opening Cmin at the current timing, and next, executes a process to update the threshold set for the throttle opening C0 and the past minimum throttle opening Cmin (Step S116). Specifically, the abnormality detection ECU 42 updates the threshold set for the throttle opening C0, to a value that is obtained by subtracting a value obtained by subtracting the current throttle opening C from the past minimum throttle opening Cmin, from the threshold set for the throttle opening C0 at the start timing of the process (referred to as the "previous threshold set for the throttle opening" below), namely, (C0←C0−(Cmin−C)). Also, after that, the abnormality detection ECU 42 updates the past minimum throttle opening Cmin to the current throttle opening C.

Note that if the abnormality detection ECU 42 determines at Step S102 that the master pressure Pm is greater than or equal to the predetermined pressure, and the stop lamp switch 52 is in an on state; determines at Step S106 that the rotational speed NE of the internal combustion engine 12 is less than or equal to the predetermined constant, or time during which the rotational speed NE is maintained to be stable is less than or equal to the predetermined time; or determines at Step S112 that C≥C0 is satisfied, then, the abnormality detection ECU 42 executes a process to reset the past minimum throttle opening Cmin and the threshold set for the throttle opening C0 to the respective clear values (Step S118).

After having executed Step S114 or S116, the abnormality detection ECU 42 calculates a threshold time T0 used for detecting a timing to determine whether the negative pressure sensor 46 is abnormal, based on the threshold set for the throttle opening C0 that has been maintained or updated (Step S120). This threshold time T0 is a threshold of an elapsed time during which the rotational speed NE of the internal combustion engine 12 is stably maintained above the predetermined constant while the braking operation is off, with which the inmani negative pressure and the negative pressure in the brake booster 22 are not expended.

Note that this threshold time T0 is subject to change depending on the threshold set for the throttle opening C0. Specifically, as illustrated in FIG. 5, the threshold time T0 is longer while the threshold set for the throttle opening C0 is greater; extremely longer once the threshold set for the throttle opening C0 exceeds a predetermined value C0*sh*; and shorter while the threshold set for the throttle opening C0 is less. Note that this predetermined value C0*sh* may be equivalent to the initial value and the clear value of the threshold set for the throttle opening C0. Also, the threshold time T0 and the predetermined value C0*sh* may be set depending on the performance of the internal combustion engine 12 and the performance of the brake booster 22.

After having calculated the threshold time T0 at Step S120, the abnormality detection ECU 42 determines whether the elapsed time, during which the rotational speed NE of the internal combustion engine 12 is stably maintained above the predetermined constant while the braking operation is off, is greater than or equal to the threshold time T0 (Step S122). Consequently, if determining that the elapsed time is less than the threshold time T0, the current routine ends.

On the other hand, if determining that the elapsed time is greater than or equal to the threshold time T0, then, the abnormality detection ECU 42 calculates a negative pressure threshold P0 used for determining whether the negative pressure sensor 46 is abnormal (especially, abnormal due to deviation), based on the threshold set for the throttle opening C0 that has been maintained or updated at Step S114 or 116 (Step S124). This negative pressure threshold P0 is a threshold for the negative pressure Pvac based on a sensor value from the negative pressure sensor 46, and includes a negative pressure threshold Pd0 to determine whether an abnormality due to deviation occurs toward the atmospheric pressure side in the negative pressure sensor 46, and a negative pressure threshold Pu0 to determine whether an abnormality due to deviation occurs toward the vacuum pressure side. A normal range of the negative pressure Pvac of the negative pressure sensor 46 is a range between the negative pressure threshold Pd0 and the negative pressure threshold Pu0.

Note that both the negative pressure thresholds Pd0 and Pu0 are subject to change depending on the threshold set for the throttle opening C0. Specifically, as illustrated in FIG. 6, the negative pressure thresholds Pd0 and Pu0 are less while the threshold set for the throttle opening C0 is greater, and greater while the threshold set for the throttle opening C0 is less. Also, the negative pressure thresholds Pd0 and Pu0 may be set depending on the performance of the internal combustion engine 12 and the performance of the brake booster 22.

After having calculated the negative pressure thresholds Pd0 and Pu0 at Step S124, the abnormality detection ECU 42 reads the output signal from the negative pressure sensor 46 (Step S126). Then, the abnormality detection ECU 42 determines whether the negative pressure Pvac in the negative pressure generation location based on a sensor value of the negative pressure sensor 46 is greater than or equal to the negative pressure threshold Pd0, and less than or equal to the negative pressure threshold Pu0 (Pd0≤Pvac≤Pu0; Step S128).

If determining at Step S128 that Pd0≤Pvac≤Pu0 is satisfied, the abnormality detection ECU 42 determines that the negative pressure Pvac based on the sensor value of the negative pressure sensor 46 is within the normal range, and determines that the negative pressure sensor 46 is in a normal state (Step S130). On the other hand, if determining at Step S128 that Pd0≤Pvac≤Pu0 is not satisfied, the abnormality, detection ECU 42 determines that the negative pressure Pvac based on the sensor value of the negative pressure sensor 46 is deviated out of the normal range, and determines that the negative pressure sensor 46 is in an abnormal state (Step S132). Specifically, if determining that the negative pressure Pvac based on the sensor value is on the atmospheric pressure side with respect to the normal range (specifically, the negative pressure threshold Pd0), the abnormality detection ECU 42 determines that an abnormality due to deviation occurs in the negative pressure sensor 46, with which the sensor value is deviated toward the positive pressure side than an actual negative pressure. Also, if determining that the negative pressure Pvac based on the sensor value is on the vacuum pressure side with respect to the normal range (specifically, the negative pressure threshold Pu0), the abnormality detection ECU 42 determines that an abnormality due to deviation occurs in the negative pressure sensor 46, with which the sensor value is deviated toward the vacuum pressure side than an actual negative pressure.

If determining at Step S132 that the negative pressure sensor 46 is in an abnormal state, then, as an abnormality handling process, the abnormality detection ECU 42 issues a command to the engine ECU 40 via the in-vehicle LAN 44, to inhibit the internal combustion engine 12 from stopping automatically by the S&S control; stores the abnormal state of the negative pressure sensor 46 in the diagnostic memory; and has the MIL 54 lit to display an indication of the abnormality of the negative pressure sensor 46, or the inhibition of having the internal combustion engine 12 stop automatically. Note that this inhibition of automatic stopping of the internal combustion engine 12 accompanying the abnormality determination of the negative pressure sensor 46, may include a step to have the internal combustion engine 12 start automatically if the negative pressure sensor 46 is determined to be in an abnormal state while having the internal combustion engine 12 stop automatically.

Also, if determining at Step S130 that the negative pressure sensor 46 is in a normal state, then, as a normal process, the abnormality detection ECU 42 issues a command to the engine ECU 40 via the in-vehicle LAN 44, to release inhibiting the internal combustion engine 12 from stopping automatically by the S&S control; and turns off the MIL 54 to release the indication of the abnormality of the negative pressure sensor 46, or the inhibition of having the internal combustion engine 12 stop automatically.

In the control apparatus 14 for the internal combustion engine 12, in response to receiving the command from the abnormality detection ECU 42 to inhibit the internal combustion engine 12 from stopping automatically by the S&S control, the engine ECU 40 inhibits the internal combustion engine 12 from stopping automatically by the S&S control. Therefore, the engine ECU 40 can inhibit the internal combustion engine 12 from stopping automatically by the S&S control when the negative pressure sensor 46 is abnormal. Also, in response to receiving a command from the abnormality detection ECU 42 to release the inhibition of having the internal combustion engine 12 stop automatically by the S&S control, the engine ECU 40 releases the inhibition of having the internal combustion engine 12 stop automatically by the S&S control. Therefore, if the negative pressure sensor 46 returns to a normal state after the abnormality has occurred, it is possible to release the inhibition of having the internal combustion engine 12 stop automatically by the S&S control, to allow automatic stopping.

In this way, the negative pressure abnormality detection apparatus 10 in the present embodiment can determine whether the negative pressure sensor 46 is in an abnormal state, based on whether the negative pressure Pvac, as a sensor value of the negative pressure sensor 46, is in the normal range between the negative pressure threshold Pd0 and the negative pressure threshold Pu0 while the internal combustion engine 12 rotates and the braking operation on the brake pedal 20 is off. Specifically, the negative pressure abnormality detection apparatus 10 determines that the negative pressure sensor 46 is in a normal state if the negative pressure Pvac is greater than or equal to the negative pressure threshold Pd0 and less than or equal to the negative pressure threshold Pu0; determines that the negative pressure sensor 46 is in an abnormal state where deviation occurs toward the atmospheric pressure side if the negative pressure Pvac is less than the negative pressure threshold Pd0; or determines, that the negative pressure sensor 46 is in an abnormal state where deviation occurs toward the vacuum pressure side if the negative pressure Pvac is greater than the negative pressure threshold Pu0. Therefore, according to the negative pressure abnormality detection apparatus 10 in the present embodiment, it is possible to detect an abnormality of the negative pressure sensor 46 due to deviation.

Also, in the present embodiment, the negative pressure threshold P0 (specifically, Pd0 and Pu0) used for determining whether the negative pressure sensor 46 is abnormal, is changed depending on the threshold set for the throttle opening C0. This threshold set for the throttle opening C0 is a value obtained by subtracting a minimum value of the throttle opening C based on the sensor value of the throttle opening sensor 56 until a current timing, from the initial value or the clear value that have been determined in advance. Therefore, the negative pressure threshold P0 is set to a value that depends on the minimum value of the throttle opening C. Specifically, the negative pressure threshold P0 is set greater while the minimum value of the throttle opening C is less, or set less while the minimum value of the throttle opening C is greater.

When the throttle opening C is greater, the inmani negative pressure generated in the inmani 30 is less, and hence, the negative pressure generated in the negative pressure chamber 24 of the brake booster 22 is less. In this regard, to correctly determine whether the negative pressure sensor 46 is abnormal, it is appropriate to set the negative pressure threshold P0 in accordance with the inmani negative pressure, namely, the throttle opening C. As described above, in the present embodiment, the negative pressure threshold P0 is set to a value that depends on the minimum value of the throttle opening C (the threshold set for the throttle opening C0).

Therefore, according to the present embodiment, if the minimum value of the throttle opening C is comparatively greater, the negative pressure threshold Pd0 is less. Therefore, if an abnormality due to deviation toward the atmospheric pressure side does not occur with the negative pressure sensor 46, it is possible to avoid having the detected the negative pressure Pvac be less than the negative pressure threshold Pd0, and to prevent an erroneous determination that the negative pressure sensor 46 is in an abnormal state. Also, conversely, if the minimum value of the throttle opening C is comparatively less, the negative pressure threshold Pd0 is greater. Therefore, if an abnormality due to deviation toward the atmospheric pressure side occurs with the negative pressure sensor 46, it is possible to avoid having the detected negative pressure Pvac be greater than the negative pressure threshold Pd0, and to prevent that a determination is not made for the negative pressure sensor 46 that is in an abnormal state.

Similarly, if the minimum value of the throttle opening C is comparatively greater, the negative pressure threshold Pu0 is less. Therefore, if an abnormality due to deviation toward the vacuum pressure side occurs with the negative pressure sensor 46, it is possible to avoid having the detected the negative pressure Pvac be less than the negative pressure threshold Pu0, and to prevent that a determination is not made for the negative pressure sensor 46 that is in an abnormal state. Also, conversely, if the minimum value of the throttle opening C is comparatively less, the negative pressure threshold Pu0 is greater. Therefore, if an abnormality due to deviation toward the vacuum pressure side does not occur with the negative pressure sensor 46, it is possible to avoid having the detected the negative pressure Pvac be greater than the negative pressure threshold Pu0, and to prevent an erroneous determination that the negative pressure sensor 46 is in an abnormal state.

Therefore, according to the negative pressure abnormality detection apparatus 10 in the present embodiment, even if the throttle opening of the throttle valve 32 fluctuates, it is possible to correctly determine whether the negative pressure sensor 46 is abnormal, by changing the negative pressure threshold P0 in accordance with the fluctuation.

Also, in the present embodiment, the threshold time T0, which is used for detecting a timing to determine whether the negative pressure sensor 46 is abnormal, is changed depending on the threshold set for the throttle opening C0. As described above, this threshold set for the throttle opening C0 is a value obtained by subtracting a minimum value of the throttle opening C based on the sensor value of the throttle opening sensor 56 until a current timing, from the initial value or the clear value that have been determined in advance. Therefore, the threshold time T0 is set to the value that depends on the minimum value of the throttle opening C.

While the throttle opening C is greater, the inmani negative pressure generated in the inmani 30 is less, and hence, the speed is slower for the negative pressure generated in the negative pressure chamber 24 of the brake booster 22 to be greater. In this regard, to correctly determine whether the negative pressure sensor 46 is abnormal, it is appropriate to set the threshold time T0 in accordance with the inmani negative pressure, namely, the throttle opening C. As described above, in the present embodiment, the threshold time T0 is set to a value that depends on the minimum value of the throttle opening C (the threshold set for the throttle opening C0). Therefore, according to the present embodiment, even if the throttle opening of the throttle valve 32 fluctuates, it is possible to improve precision for determining whether the negative pressure sensor 46 is abnormal, by changing the threshold time T0 in accordance with the fluctuation.

Note that, in the present embodiment, to set the negative pressure thresholds Pd0 and Pu0 and the predetermined time T0, the threshold set for the throttle opening C0 is used that takes a value on the throttle-opening side, compared to the minimum value of the throttle opening C (specifically, the past minimum throttle opening Cmin, or the current throttle opening C if the current throttle opening C is less than the past minimum throttle opening Cmin). Therefore, even if the throttle opening C takes a small value temporarily or as noise, the small value is not used as the minimum value as is, but the threshold set for the throttle opening C0 may be used as the minimum value that is a value on the throttle-opening side compared to the small value. Therefore, sufficient negative pressure can be generated in the negative pressure chamber 24 of the brake booster 22, to improve precision for determining whether the negative pressure sensor 46 is abnormal.

Also, in the present embodiment, whether the negative pressure sensor 46 is abnormal is determined only when the inmani negative pressure and the negative pressure in the brake booster 22 are not expended while the internal combustion engine 12 rotates at a predetermined constant rotational speed or greater. Configured in this way, it is possible to improve precision for determining whether the negative pressure sensor 46 is abnormal because whether the negative pressure sensor 46 is abnormal can be determined at a timing when the negative pressure is securely generated in the brake booster 22.

Also, in the present embodiment, if the negative pressure abnormality detection apparatus 10 detects that the negative pressure Pvac, which is generated at the negative pressure location and detected by using the negative pressure sensor 46 while having the internal combustion engine 12 stop automatically by the S&S control, takes a value on the atmospheric pressure side compared to the predetermined negative pressure, then, the negative pressure abnormality detection apparatus 10 has the abnormality detection ECU 42 issue a command to the engine ECU 40 of the control apparatus 14 via the in-vehicle LAN 44, to have the internal combustion engine 12 start automatically by the S&S control. Furthermore, if determining that the negative pressure sensor 46 is in an abnormal state, the negative pressure abnormality detection apparatus 10 has the abnormality detection ECU 42 issue a command to the engine ECU 40 of the control apparatus 14 via the in-vehicle LAN 44, to have the internal combustion engine 12 stop automatically by the S&S control.

Therefore, according to the present embodiment, if the negative pressure in the negative pressure generation location is shifted toward the atmospheric pressure side with respect to the predetermined negative pressure while having the internal combustion engine 12 stop automatically by the S&S control, and hence, it is difficult to have the vehicle 16 kept stopped as it has been, it is possible to release having the internal combustion engine 12 stop automatically by the S&S control, and to have the internal combustion engine 12 start automatically. Therefore, it is possible to resume supplying the negative pressure to the brake booster 22, to generate an assist force by the brake booster 22 for having the vehicle 16 kept stopped securely.

Also, if an abnormality due to deviation toward the vacuum pressure side occurs with the negative pressure sensor 46, the negative pressure as a sensor value of the negative pressure sensor 46 may be kept greater than or equal to the predetermined negative pressure even though an actual negative pressure is shifted to the atmospheric pressure side with respect to the predetermined negative pressure. In this case, the control as described above, in which automatic stopping of the internal combustion engine 12 by the S&S control is released to have the internal combustion engine 12 start automatically based on whether the negative pressure is shifted toward the atmospheric pressure side with respect to the predetermined negative pressure, by itself cannot release the automatic stopping of the internal combustion engine 12, and cannot have the internal combustion engine 12 start automatically. Therefore, it may be difficult to generate an assist force to have the vehicle 16 kept stopped securely.

In contrast to this, according to the present embodiment, if an abnormality due to deviation including an offset shift toward the vacuum pressure side is detected in the negative pressure sensor 46, it is possible to inhibit the internal combustion engine 12 from stopping automatically by the S&S control, and to drive the internal combustion engine 12. Therefore, it is possible to execute supplying the negative pressure to the brake booster 22, and to generate an assist force by the brake booster 22 for having the vehicle kept stopped securely. Therefore, according to the control apparatus 14 for the internal combustion engine 12 in the present embodiment, if an abnormality due to deviation including an offset shift toward the vacuum pressure side occurs with the negative pressure sensor 46, the above inconvenience occurring when having the internal combustion engine 12 stop automatically, can be avoided.

Also, in the present embodiment, it is possible to correctly determine whether the negative pressure sensor 46 is abnormal as described above, and hence, it is possible to precisely execute inhibiting the internal combustion engine 12 from stopping automatically when an abnormality due to deviation occurs with the negative pressure sensor 46.

Also, in the present embodiment, if the negative pressure sensor 46 is determined to be in an abnormal state as described above, the abnormality of the negative pressure sensor 46 is stored in the diagnostic memory. Therefore, according to the present embodiment, it is possible to easily identify an abnormality location of the vehicle 16 at a vehicle dealer or the like after an abnormality has occurred with the negative pressure sensor 46.

Also, in the present embodiment, as described above, if the negative pressure sensor 46 is determined to be in an abnormal state, or the internal combustion engine 12 is inhibited from stopping automatically by the S&S control following the abnormality determination of the negative pressure sensor 46, then, the MIL 54 is lit to indicate the abnormality of the negative pressure sensor 46, or the inhibition of having the internal combustion engine 12 stop automatically. In this case, by watching the MIL 54, the driver can recognize the abnormality of the negative pressure sensor 46, or the inhibition of having the internal combustion engine 12 stop automatically. Therefore, according to the present embodiment, if an abnormality occurs with the negative pressure sensor 46, the abnormality of the negative pressure sensor 46, or the inhibition of having the internal combustion engine 12 stop automatically is promptly indicated to the driver by the MIL 54, and hence, it is possible to prompt the driver to replace or repair the negative pressure sensor 46 having the abnormality.

Furthermore, in the present embodiment, once the negative pressure sensor 46 has been determined to be in an abnormal state, and then, the negative pressure sensor 46 is determined to be in a normal state, the inhibition of having the internal combustion engine 12 stop automatically is released, and the MIL 54 is turned off. Therefore, according to the present embodiment, if the negative pressure sensor 46 returns to a normal state from an abnormal state, then, automatic stopping of the internal combustion engine 12 by the S&S control is allowed to improve the fuel efficiency, and unnecessary replacement or repair of the negative pressure sensor 46 can be avoided.

Note that, in the above embodiment, the abnormality detection ECU 42 of the negative pressure abnormality detection apparatus 10 detecting the negative pressure Pvac in the negative pressure generation location based on a signal supplied from the negative pressure sensor 46, corresponds to a "negative pressure detection unit" described in the claims; the abnormality detection ECU 42 executing Step S128 in the routine illustrated in FIG. 3, corresponds to an "abnormality determination unit" described in the claims; and the abnormality detection ECU 42 executing Step S124 corresponds to a "threshold change unit" described in the claims; the abnormality detection ECU 42 executing Step S120 corresponds to a "time change unit" described in the claims.

Also, in the above embodiment, the engine ECU 40 of the control apparatus 14 executing the S&S control corresponds to an "automatic control unit" described in the claims; and the engine ECU 40 inhibiting the internal combustion engine 12 from stopping automatically by the S&S control in response to a command from the abnormality detection ECU 42, corresponds to an "automatic stopping inhibition unit" described in the claims.

Incidentally, in the above embodiment, as abnormalities of the negative pressure sensor 46, an abnormality due to deviation toward the atmospheric pressure side, and an abnormality due to deviation toward the vacuum pressure side are detected. However, the present invention is not limited to that, but one of the abnormalities due to deviation may be detected.

Also, in the above embodiment, the negative pressure thresholds Pd0 and Pu0, and the predetermined time T0 are changed depending on a value based on the minimum value of the throttle opening C while the internal combustion engine 12 rotates and the braking operation is off (namely, the threshold set for the throttle opening C0). However, the present invention is not limited to that, but the change may depend on the minimum value of the throttle opening C itself, or an average value or a time integral value of the throttle opening C while the internal combustion engine 12 rotates and the braking operation is off.

Also, in the above embodiment, if the negative pressure sensor 46 is determined to be in an abnormal state, automatic stopping of the internal combustion engine 12 by the S&S control is inhibited. However, the present invention is not limited to that, but even if the negative pressure sensor 46 is determined to be in an abnormal state, automatic stopping of the internal combustion engine 12 by the S&S control may be restrictively allowed. For example, if the negative pressure sensor 46 is determined to be in an abnormal state, a zero-point correction of the sensor, or a change of an operation allowance threshold for allowing to have the internal combustion engine 12 stop automatically by the S&S control, may be executed. Note that the operation allowance threshold may be changed, for example, by adding a margin that corresponds to reduced precision of the negative pressure sensor 46, to an operation allowance threshold to be used when the negative pressure sensor 46 is in a normal state.

Also, in the above embodiment, as a unit to indicate the abnormality of the negative pressure sensor 46, or the inhibition of having the internal combustion engine 12 stop automatically, to the driver, the MIL 54 is used, which is an indicator lamp disposed in the meter. However, the present invention is not limited to that, but another display unit may be used, or instead of or together with a visible unit, an audible unit may be used.

Furthermore, in the above embodiment, the abnormality detection ECU 42 of the negative pressure abnormality detection apparatus 10, and the engine ECU 40 of the control apparatus 14 for the internal combustion engine 12 are separated to be independent from each other, and are connected with each other via the in-vehicle LAN 44. However, the present invention is not limited to that, but the abnormality detection ECU 42 and the engine ECU 40 may be configured in the same ECU.

The present application is based on and claims the benefit of priority of Japanese Priority Application No. 2014-253410, filed on Dec. 15, 2014, the entire contents of which are hereby incorporated by reference.

The invention claimed is:

1. A negative pressure abnormality detection apparatus, comprising:
    a negative pressure sensor configured to output a signal depending on a negative pressure in a negative pressure chamber of a brake booster into which an intake negative pressure of an intake manifold generated by rotation of an internal combustion engine is introduced;
    a negative pressure detection unit configured to detect the negative pressure based on the signal from the negative pressure sensor;
    an abnormality determination unit configured to determine whether an abnormality occurs with the negative pressure sensor, based on whether the negative pressure detected by the negative pressure detection unit is shifted toward an atmospheric pressure side or a vacuum pressure side with respect to a threshold, when a state continues for a predetermined time or longer during which the internal combustion engine rotates and a negative pressure expending operation expending the negative pressure is not performed on a brake pedal by a driver; and
    a threshold change unit configured to change the threshold depending on an opening of a throttle valve disposed in an intake pipe on an upstream side of the intake manifold, while the state continues.

2. The negative pressure abnormality detection apparatus, as claimed in claim 1, wherein the threshold change unit sets the threshold greater when the opening is less than a predetermined threshold, while the state continues.

3. The negative pressure abnormality detection apparatus, as claimed in claim 1, wherein the threshold change unit changes the threshold depending on a minimum value of the opening while the state continues.

4. The negative pressure abnormality detection apparatus, as claimed in claim 1, further comprising:
    a time change unit configured to change the predetermined time depending on the opening while the state continues.

5. The negative pressure abnormality detection apparatus, as claimed in claim 4, wherein the time change unit sets the predetermined time shorted when the opening is less than a predetermined threshold, while the state continues.

6. The negative pressure abnormality detection apparatus, as claimed in claim 4, wherein the time change unit changes the predetermined time depending on a minimum value of the opening while the state continues.

7. A control apparatus for an internal combustion engine, comprising:
    an automatic control unit configured to have the internal combustion engine stop automatically when a predetermined stopping condition is satisfied, and to have the internal combustion engine restart automatically when a predetermined restarting condition is satisfied; and
    an automatic stopping inhibition unit configured to inhibit the internal combustion engine from stopping automatically by the automatic control unit when the negative pressure sensor is determined to be in an abnormal state by the abnormality determination unit included in the negative pressure abnormality detection apparatus as claimed in claim 1.

* * * * *